United States Patent [19]

Moyer et al.

[11] Patent Number: 5,416,910
[45] Date of Patent: May 16, 1995

[54] METHOD AND APPARATUS FOR PERFORMING BUS ARBITRATION IN A DATA PROCESSING SYSTEM

[75] Inventors: William C. Moyer, Dripping Springs; James B. Gullette; Michael J. Garcia, both of Austin, all of Tex.

[73] Assignee: Motorola, Inc., Schaumburg, Ill.

[21] Appl. No.: 218,146

[22] Filed: Mar. 25, 1994

Related U.S. Application Data

[63] Continuation of Ser. No. 845,902, Mar. 4, 1992, abandoned.

[51] Int. Cl.$^6$ ............................................. G06F 13/36
[52] U.S. Cl. ................................. 395/325; 340/825.5; 370/85.6; 364/240; 364/240.1; 364/240.2; 364/242.6; 364/242.92; 364/240.5; 364/DIG. 1
[58] Field of Search ............. 395/325, 725, 425, 275; 370/85.2, 85.6; 340/825.5, 825.52

[56] References Cited

U.S. PATENT DOCUMENTS

| | | | |
|---|---|---|---|
| 4,281,381 | 7/1981 | Ahuja et al. | 395/325 |
| 4,586,128 | 4/1986 | DeWoskin | 395/725 |
| 4,661,905 | 4/1987 | Bomba et al. | 395/325 |
| 4,763,249 | 8/1988 | Bomba et al. | 395/325 |
| 4,785,394 | 11/1988 | Fischer | 395/325 |
| 4,789,926 | 12/1988 | Clarke | 395/325 |
| 4,817,037 | 3/1989 | Hoffman et al. | 395/325 |
| 4,818,985 | 4/1989 | Ikeda | 340/825.5 |
| 4,987,529 | 1/1991 | Craft et al. | 395/325 |
| 4,991,172 | 2/1991 | Cidon et al. | 370/94.100 |
| 5,119,292 | 6/1992 | Baker et al. | 395/725 |
| 5,191,656 | 3/1993 | Forde, III et al. | 395/325 |
| 5,195,185 | 3/1993 | Marenin | 395/325 |
| 5,301,282 | 4/1994 | Amini et al. | 395/325 |

*Primary Examiner*—Gopal C. Ray
*Attorney, Agent, or Firm*—Charlotte B. Whitaker

[57] ABSTRACT

A data processing system (10) and method for performing bus arbitration protocol using an arbiter (14). The data processing system (10) has multiple bus masters (12, 16) each of which is coupled to multiple shared buses (20, 22, 24, 28). The arbiter (14) detects a bus request from a requesting bus master, and responds with a bus grant to notify the requesting bus master that the arbiter has selected the requesting bus master to be a bus-master elect for a shared bus (20). The requesting bus master monitors a shared signal line to determine when a current bus master has released ownership of the shared bus (20). When the requesting bus master assumes ownership of the shared bus it deactivates the bus request signal for a dock period after commencement of the bus transaction, which allows the arbiter (14) to select a next bus master-elect, thereby preventing any bus master from monopolizing the shared bus (20).

16 Claims, 2 Drawing Sheets

METHOD AND APPARATUS FOR PERFORMING BUS ARBITRATION IN A DATA PROCESSING SYSTEM

This application is a continuation of prior application Ser. No. 07/845,902, filed Mar. 4, 1992, now abandoned.

CROSS-REFERENCE TO A RELATED APPLICATION

This patent application is related to a U.S. patent application Attorney Docket No. SC-01554A entitled "A Method and Apparatus for Performing a Snoop-Retry Protocol in a Data Processing System", and filed concurrently herewith.

1. Field of the Invention

This invention relates generally to data processing systems, and more particularly to data processing systems which perform bus arbitration.

2. Background of the Invention

Today's high performance data processor with on-chip caches or pipelined input/output (I/O) units (e.g. instruction sequencers, load/store units) has the potential to generate multiple independent internal requests for access to an external memory system. Due to packaging pin count limitations, all of these data processor resources must access external memory via a single bus interface unit (BIU). Since multiple independent internal requests may appear at the BIU at any given time, the data processor requires an internal bus arbitration scheme to determine which of the internal requests is selected to access the system bus. In multi-master systems, where one or more of the data processors has the capability of becoming bus master, the bus arbitration protocol determines which data processor(s) becomes the bus master. Typically, these multi-systems employ an arbitration protocol in which an external arbiter controls bus arbitration, and each data processor requests access to the shared external memory, from the arbiter, using bus arbitration signals.

For example, in a centralized, three-wire arbitration protocol, the three main control signals used by the data processor are a bus request (BR*) output, a bus grant (BG*) input, and a bus busy (ABB*) input/output (where "*" denotes an active low signal). The arbitration protocol allows arbitration to be overlapped with bus activity. Accordingly, requests from potential bus masters via their respective BR* signals may overlap with a current bus transaction, with the transfer of bus ownership (bus hand-off) being controlled by the external arbiter providing the (BG*) signal and the current bus master providing the ABB* signal. Thus, a first data processor requests the bus from the arbiter by asserting their BR* signal, whenever an internal bus request is pending. The first data processor continues to assert the BR* signal until the arbiter indicates (via the BG* signal) that the arbiter has selected the data processor as the next bus master, and the first data processor determines that the address bus is not busy. Accordingly, once the arbiter asserts the BG* signal of the first data processor, the first data processor monitors the bus busy (ABB*) signal to determine when the bus cycle of the previous (alternate) master has been completed. After the ABB* signal is negated by the alternate master, the first data processor asserts the ABB* signal to indicate ownership of the bus and begins the bus cycle.

After the bus cycle starts, the first data processor continues to assert BR* if another internal bus request is pending, or negates the BR* signal if no further accesses are required. Thus, a data processor using this arbitration protocol along with an on-chip Harvard architecture may generate independent and overlapping internal requests for external bus access. An internal bus request could be generated simultaneously from the instruction side and the load/store side. Alternatively, an internal request could come from the load/store side while the instruction side is already the external bus owner and is performing an external bus instruction fetch, or vice versa. In either case, it is desirable to issue the pending internal request to the external arbiter as early as possible to take advantage of the arbitration overlap with the current bus master.

Generally, multi-master systems depend on some sort of "Fairness" arbitration protocol to prevent any one bus master from monopolizing the external bus. A typical Fairness protocol would limit each bus master to one bus transaction when the arbiter receives requests from multiple potential bus masters. Essentially, the arbiter would allow each master a turn in round-robin fashion. It is desirable, however, to allow certain bus transactions (e.g. read-modify write) to execute indivisibly. Since the data processor has multiple independently generated internal bus requests, in some instances the data processor's external bus request (BR*) signal will be held asserted continuously. Consequently, a Fairness external arbiter may be forced to monitor other control signals from the external bus, in addition to the BR* signal, in order to insure that certain bus transactions execute indivisibly. Due to logic complexity and pin count limitations, implementation of such a Fairness arbiter is difficult and problematic.

SUMMARY OF THE INVENTION

In one form, the present invention comprises a data processing system and method for performing bus arbitration protocol using an arbiter. The data processing system has a predetermined number of bus masters each of which is coupled to a predetermined number of shared buses. The arbiter is coupled to each of said predetermined number of bus masters, to control allocation of bus ownership. The arbiter detects activation of a bus request signal by a first requesting bus master, and provides a bus grant signal in response thereto. The bus grant signal notifies the first requesting bus master that the arbiter has selected the first requesting bus master to be a first bus-master elect. The first requesting bus master monitors a shared signal line to detect deactivation, by a current bus master, of a bus busy signal. The deactivation of the bus busy signal notifies the first requesting bus master that a current bus master has released ownership of a first shared bus. The first requesting bus master deactivates the bus request signal for a predetermined clock period before assuming ownership of the first shared bus. The deactivation of the bus request signal for the clock period allows the arbiter to select a new bus master-elect, thereby preventing the current bus master from monopolizing the first shared bus.

The present invention will be understood by one skilled in the art from the detailed description below in conjunction with the accompanying drawings.

DETAILED DESCRIPTION OF A PREFERRED EMBODIMENT

The terms "assert" and "assertion" are used when referring to the rendering of a signal or similar apparatus into its logically true (active) state, whereas, "negate" and "negation" are used when the signal or other apparatus is rendered into its logically false (inactive) state. The asterisk symbol will be used to indicate a complemented signal. For example, BUS REQUEST* indicates a signal that is the complementary logic state of the BUS REQUEST signal.

Figure 1:
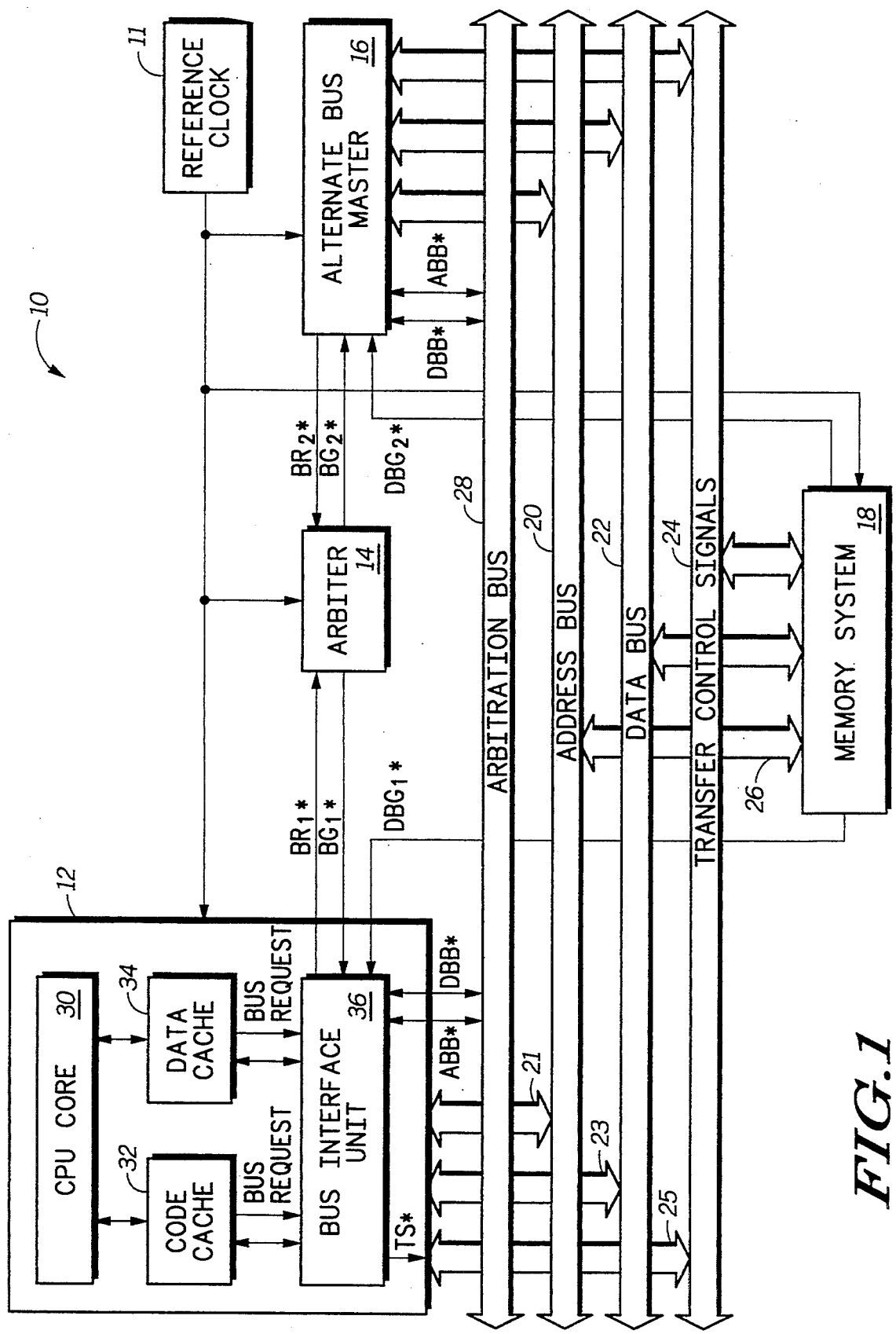
FIG. 1 illustrates, in block diagram form, a data processing system for performing bus arbitration, in accordance with the present invention.

Illustrated in FIG. 1 is a preferred embodiment of a multi-master data processing system 10 which uses a centralized arbitration system that simplifies the implementation of a fairness protocol, in accordance with the present invention. In the illustrated form, an address bus 20, data bus 22, and the transfer control signal lines 24 are coupled to, and shared by, a data processor (DP) 12 and other bus masters, herein singularly represented by alternate bus master (ABM) 16, to access an external memory system 18. The transfer control signals provide the basic handshake between the bus masters (data processor 12 and alternate bus master 16) and memory system 18. As illustrated in FIG. 1, an arbiter 14 is coupled to the data processor 12 and the alternate bus master 16 to control the allocation of ownership of the shared address bus 20. A reference clock generator 11 provides a clock (CLK) signal to the bus masters (data processor 12 and alternate bus master 16), the arbiter 14, and the memory system 18. In system 10, data processor 12 uses an internal Harvard architecture wherein an instruction sequencer (not shown) in a CPU core 30 fetches instructions from an instruction cache memory management unit (CODE CACHE) 32, and a load/store unit (not shown) in the CPU core 30 performs data reads/writes to a data cache memory management unit (DATA CACHE) 34. Both the CODE CACHE 32 and the DATA CACHE 34 generate internal bus request signals which are used to notify a Bus Interface Unit (BIU) 36 when an external memory access is required.

Traditionally, data processing systems implement tenured or connected bus interfaces, whereby the data processor retains ownership over both the address and data bus until the transaction is terminated. In accordance with the present invention, system 10 uses a fairness arbitration protocol whereby the arbiter 14 is capable of controlling the allocation of the address bus 20 to the requesting masters. In a preferred embodiment of the present invention, system 10 employs multiple bus masters but does not support split bus transactions. Consequently, the data bus 22 can be continuously granted to the bus masters and arbitration is only required for address bus 20 mastership. Each potential bus master (data processor 12 or alternate bus master 16) has an independent bus request output signal, BR$_1$* and BR$_2$*, respectively, and an independent bus grant input signal, BG$_1$* and BG$_2$*, respectively, which are used to preform address bus arbitration. In a preferred embodiment an address bus busy (ABB*) signal line is shared by the bus masters, via an arbitration bus 28. Accordingly, the bi-directional ABB* signal is asserted by the current address bus master to indicate that potential bus masters must wait to take ownership of the address bus 20.

In accordance with the present invention, a potential bus master asserts its bus request signal to request address bus 20 mastership. The bus grant signal is used by the external arbiter 14 to grant address bus 20 mastership in response to a bus request. Accordingly, the arbiter 14 looks at the BR* signals from each of the multiple potential bus masters (i.e. data processor 12, alternate bus master 16) and uniquely asserts the BG* input signal of one of the masters. The master whose BG* input signal is asserted by arbiter 14 is referred to as the "master-elect". The master-elect must wait until any current bus master releases address bus 20 ownership before taking control. As previously indicated, a current bus master indicates ownership of the address bus 20 by asserting ABB*. Upon completion of the bus transaction, the current bus master negates and releases the ABB* signal during a single clock bus hand-off. The master-elect only assumes address bus 20 ownership if its BG* signal is asserted and the ABB* signal is negated indicating the address bus 20 is not busy. Accordingly, potential bus masters use the ABB* signal to "qualify" the BG* input signal. Thus, ABB* is an output signal from the current bus master, and an input to all potential bus masters.

Figure 2:
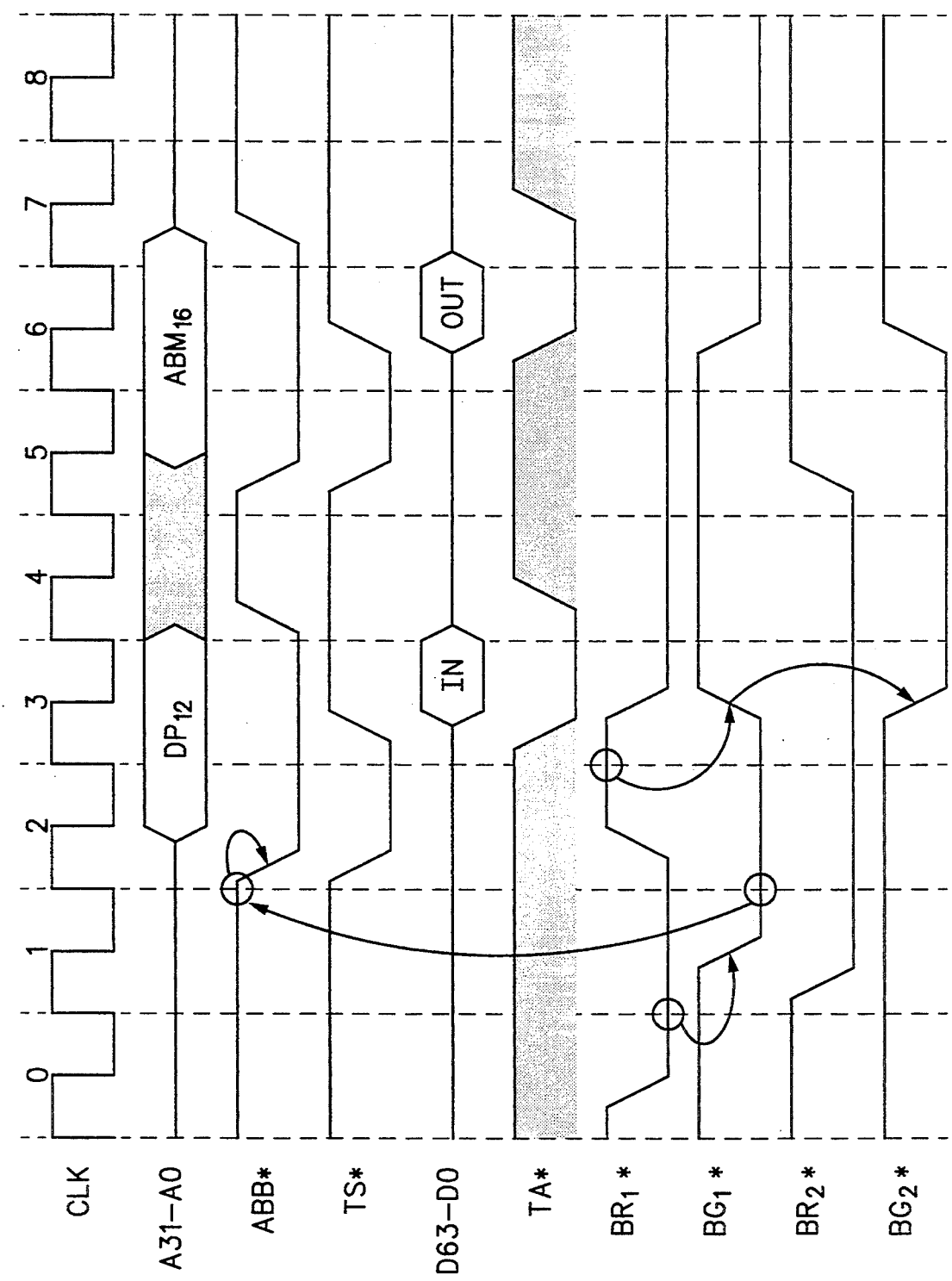
FIG. 2 illustrates, in timing diagram form, a bus arbitration protocol associated with the system of FIG. 1 and incorporating a fairness oriented bus request mechanism, in accordance with the present invention.

Illustrated in FIG. 2 is a timing diagram 40 illustrating the one example of the operation of a fairness bus arbitration protocol in accordance with the present invention. In FIG. 2, the shaded portion of the signal indicates a "don't care" condition. Prior to beginning a bus transaction (CLK0), a potential bus master must request ownership of the address bus 20 from the arbiter 14, bus arbitration may begin before the current master completes its bus tenure. Accordingly, on the rising edge of the first clock period (CLK1), the arbiter 14 sees the BR$_1$* asserted by data processor 12, and responds by asserting the BG$_1$* signal. On the rising edge of the second clock period (CLK2), a current bus master releases the address bus 20 by negating the ABB* signal. Data processor 12 detects the assertion of the BG$_1$* signal and the negation of the ABB* signal, and thereby determines that a qualified bus grant has been received. With the exception of an indivisible bus transaction (i.e. Read-Modify-Write), a bus master will always negate its bus request signal for a single ("dead") clock period, at the beginning of the bus transaction, after receiving the qualified bus grant. Accordingly, as illustrated in FIG. 2, upon receiving the qualified bus grant, data processor 12 drives the address (e.g. A31:A0) for the requested bus access onto the address bus 20, via bus 21, and negates the BR$_1$* signal. The single clock negation of the BR$_1$* signal by data processor 12, allows the arbiter 14 to "fairly" negate the bus grant signal (BG$_1$*) for data processor 12 and select a new master-elect. The data processor 12 also assert the transfer start (TS*) signal for one clock to indicate that a valid address and attributes are present on the address bus 20.

On the rising edge of the third clock period (CLK3), the arbiter 14 detects the negation of the BR$_1$* signal and the assertion of the BR$_2$* signal by alternate bus master 16, and the arbiter 14 responds by negating the BG$_1$* signal and asserting the BG$_2$* signal. By asserting the BG$_2$* signal, the arbiter 14 selects alternate bus master 16 to become the new master-elect. As illustrated in FIG. 2, on the rising edge of the fourth clock period (CLK4), data processor 12 completes its bus tenure, by negating and releasing the ABB* signal during a one-clock bus hand-off. On the rising edge of the fifth dock period (CLK5), alternate bus master 16 detects the assertion of the $BG_2$* signal and the negation of the ABB* signal, and thereby determines that a qualified bus grant has been received. In response to detecting the qualified bus grant, alternate bus master 16 asserts the ABB* signal, starts the bus transfer, and negates the $BR_2$* signal for a single "dead" clock period, assuming that the requested bus transaction is divisible.

Under certain circumstances, the current bus master may require multiple transfers that are functionally related. For example, in the case of a Read-Modify-Write cycle, the current master (data processor 12) will continue to assert the $BR_1$* signal throughout the first locked transaction (the read). Since the external arbiter 14 does not see the $BR_1$* dead clock, as illustrated in FIG. 2, the arbiter 14 does not remove the $BG_1$* signal, therefore, no masterelect is selected during the read portion (first half) of the operation. During the second half (write portion) of the operation, the $BR_1$* negation clock is present, therefore, the arbiter 14 will assert the bus grant (e.g. $BG_2$*) signal for the new master-elect. Consequently, when data processor 12 (current master) releases the address bus by negating the ABB* signal, the alternate bus master 16 (master-elect) will take ownership of the address bus 20. This operation guarantees the indivisibility of the Read-Modify-Write operation.

In data processing systems using a shared bus, bus bandwidth is at a premium, therefore, these systems often use a split-transaction or pipelined memory bus to maximize bus throughput. In a split system, address and transfer attributes are latched locally at the appropriate memory module on the bus. The bus master then releases the address bus to allow another master to initiate a transaction. In the case of read operations, the memory system then routes the data back to the appropriate master. Whereas, for write transactions, the data is either latched along with the address, or the data transfer is postponed until the memory system is ready to be written.

In an alternate embodiment of the present invention, system 10 has separate arbitration for the address and data buses, the allocation of which may be split, to enable a pipelined bus transaction or split-transaction bus. The fairness arbitration protocol of the present invention may be used in data processing systems which employ a split-transaction bus. Accordingly, in the alternate embodiment, data processor 12 and alternate bus master 16 must arbitrate for mastership of both the address bus 20 and the data bus 22 separately. In the alternate embodiment, split transactions require the use of a separate data bus grant (DBG*) input signal which is an input into each bus master, and a data bus busy (DBB*) signal line. Accordingly, the bi-directional DBB* signal is shared by the bus masters, via the arbitration bus 28. Referring again to FIG. 1, the memory system 18 would assert the DBG* signal to control the data bus hand-off between the current master and the master-elect, in the manner described above. The master-elect would then wait until it received a non-busy data bus indication (i.e. negation of DBB*) along with an asserted DBG* (denoted herein as a "qualified data bus grant"). After receiving the qualified data bus grant the master-elect would assert the DBB* signal, thereby taking ownership of the data bus, and begin transferring data.

Accordingly, in accordance with an alternate embodiment of the present invention, the arbiter 14 implicitly controls allocation of the data bus 22. As previously described, whenever a requesting bus master (i.e. data processor 12) asserts its bus request signal ($BR_1$*), the requesting bus master is arbitrating for ownership of the address bus 20. Upon acquiring ownership of the address bus 20, data processor 12 asserts the TS* signal indicating that a valid address is is present on the address bus 20. Essentially, the TS* signal functions as an implicit one-dock data bus request signal. Once the data is ready for transfer, the memory system 18 asserts the DBG* signal. Thus, the memory system 18 directly controls data bus 22 ownership, and the arbiter 14 directly controls the address bus 20 ownership.

Thus, in accordance with the present invention, the bus interface protocol of data processing system 10 requires certain arbitration control signals (i.e. ABB*, DBB*) to be shared between the bus masters (data processor 12 and alternate bus master 16), via common bus signal lines which collectively comprise the arbitration bus 28 (FIG. 1). A shared output bus buffer (not shown) allows each of the bus masters, data processor 12 and alternate bus master 16, to drive the common bus signal line (e.g. ABB*) without bus contention. In a preferred embodiment, each bus master data processor 12 and alternate bus master 16 includes special output buffers designed to actively negate the shared signal before plating the buffer into the high impedance state. For example, the active low ABB* signal may be asserted by the current master (e.g. data processor 12) to indicate address bus ownership. When the data processor 12 relinquishes bus ownership, it places the ABB* output driver in the high impedance state allowing an external pull-up resistor to negate the ABB* signal so another master may assume ownership. Essentially, the external pull-up resistor functions as a "keeper" to maintain the shared signal as negated in the absence of a bus master.

Thus, in accordance with the present invention, the data processing system 10 employs the arbiter 16 in a manner which insures that each of the multiple bus masters (data processor 12 and alternate bus master 16) are fairly given access to the shared address and data buses, 20 and 22, respectively. The negation by the current bus master (e.g. data processor 12) of their independent bus request signal ($BR_1$*) for a signal "dead" clock period, enables the arbiter 16 to "fairly" select a new bus master-elect (i.e. alternate bus master 16) to assume ownership of the shared address bus 20, upon completion of the current bus transaction by the current bus master. Since the independent bus request signal (i.e. $BR_1$*) is negated for the single "dead" clock cycle, the arbiter 14 is free to assert a new independent bus grant signal (i.e. $BG_2$*) for the new bus master-elect. The new bus master-elect then monitors a shared signal line (ABB*) to determine when the current bus master has released ownership of the shared bus. Similarly, the new bus master-elect (alternate bus master 16) assumes ownership of the shared address bus 20 and deactivates the independent bus request signal ($BR_2$*) for a dock period after commencement of the bus transaction, which allows the arbiter 14 to select yet another bus master-elect. Accordingly, the present invention preventing any bus master from monopolizing a shared bus.

While the present invention has been described in accordance with a preferred embodiment, it should be apparent to one of ordinary skill in the art that the invention may be practiced in numerous ways. For example, in the illustrated form, arbiter 14 is a synchronous state machine which responds to transitions of the bus request signals on a rising dock edge. It would be apparent to one of ordinary skill in the art that arbiter 14 could be implemented asynchronously, assuming the arbiter logic was fast enough to accommodate the timing requirements (e.g. one dock arbitration) of system 10. Accordingly, it is intended by the appended claims to cover all modifications of the invention which fall within the true spirit and scope of the invention.

We claim:

1. In a data processing system having a predetermined number of bus masters each of which is coupled to a first shared bus and a second shared bus, a method for implementing a bus arbitration protocol using an arbiter, coupled to each of said predetermined number of bus masters, to control allocation of bus ownership, said method comprising the steps of:

detecting, via said arbiter, activation of a bus request signal by a first requesting bus master, said arbiter being independent of said predetermined number of bus masters and providing centralized control of allocation of bus ownership by uniquely providing a pre-selected bus grant signal in response to activation of said bus request signal, said arbiter independently controlling allocation of bus ownership between said predetermined number of bus masters using a fairness arbitration protocol in accordance with which said arbiter independently asserts said pre-selected bus grant signal to notify said first requesting bus master that said arbiter has independently pre-selected said first requesting bus master as a first bus master-elect;

detecting, via said first requesting bus master, deactivation of a bus busy signal by a current bus master, said bus busy signal being a bi-directional signal shared by each of said predetermined number of bus masters, and said deactivation of said bus busy signal by said current bus master notifying said first requesting bus master that said current bus master has released ownership of said first shared bus; and deactivating, via said first requesting bus master, said bus request signal for a single clock period before said first requesting bus master assumes ownership of said first shared bus, in response to detecting deactivation of said bus busy signal by said current master, to allow said arbiter to centrally control allocation of bus ownership by independently pre-selecting a new bus master-elect during said single clock period before said first requesting bus master assumes ownership of said first shared bus.

2. The method of claim 1 further comprising the steps of:

transferring information from said first requesting bus master onto said first shared bus while said first requesting bus master is deactivating said bus request signal; and reactivating, via said first requesting bus master, said bus busy to thereby indicate that said first requesting bus master is a new current bus master of said first shared bus.

3. The method of claim 1 wherein said step of detecting, via said arbiter, activation of a bus request signal by a first requesting bus master comprises the step of receiving, via said arbiter, said bus request signal generated by said first requesting bus master, said arbiter providing centralized control of allocation of bus ownership by providing a pre-selected bus grant signal in response thereto.

4. The method of claim 1 wherein said step of detecting, via said first requesting bus master, deactivation by a current bus master of a bus busy signal comprises the step of monitoring, via said first requesting bus master, said bus busy signal to determine whether said current master has negated said bus busy signal and relinquished ownership of said second shared bus, said first requesting bus master assuming ownership of said second shared bus when said current bus master negates said bus busy signal.

5. In a data processing system having a number of bus masters coupled to a first shared bus and a second shared bus, a method for implementing a bus arbitration protocol using an arbiter, coupled to each of said number of bus masters, to control allocation of bus ownership, said method comprising the steps of:

asserting, via each of said number of bus masters requesting bus ownership, a bus request signal to notify said arbiter that each of said number of bus masters are requesting a bus transaction on a first shared bus;

providing, via said arbiter, centralized control of allocation of bus ownership by independently providing a bus grant signal to a selected one of said number of bus masters, in response to said arbiter detecting the assertion of said bus request signal by each of said number of bus masters requesting bus ownership, to notify said selected one of said number of bus masters that said arbiter has independently pre-selected said selected one of said number of bus masters to become a first bus master-elect;

monitoring, by said first bus master-elect, a bus busy signal to determine when said first shared bus is available for use, said bus busy signal being controlled only by a current bus master, said current bus master indicating bus ownership by asserting said bus busy signal, and said first bus-master elect acquiring bus ownership when said current bus master negates said bus busy signal, thereby indicating that said first shared bus is available; and negating, via said first bus master-elect, said bus request signal for a single clock period, in response to said current bus master negating said bus busy signal, to allow said arbiter to centrally control allocation of bus ownership between said number of bus masters by independently asserting a new bus grant signal to pre-select a new bus master-elect during said single clock period before said first bus master-elect assumes bus ownership, said first bus master-elect thereafter acquiring ownership of said first shared bus and simultaneously initiating said bus transaction.

6. The method of claim 5 further comprising the step of: re-asserting, via said first bus master-elect said bus request signal after said single clock period has elapsed, and maintaining assertion of said bus request signal until said bus transaction is completed.

7. The method of claim 5 further comprising the steps of:

transferring, via said requesting bus master, information from said requesting bus master onto said first shared bus while said requesting bus master is deactivating said bus request signal; and re-asserting, via said requesting bus master, said bus busy signal to indicate that said requesting bus master is a new current bus master of said first shared bus.

8. The method of claim 5 wherein said step of asserting, via each of said number of bus masters requesting bus ownership, a bus request signal to notify said arbiter that each of said number of bus masters are requesting a bus transaction on a first shared bus occurs until said selected one of said bus masters receives said bus grant signal from said arbiter, thereby becoming said first bus master-elect, and said first bus master-elect subsequently determines that said first shared bus is available for use.

9. The method of claim 5 wherein said step of negating, via said first bus master-elect, said bus request signal for a single clock period, in response to said current bus master negating said bus busy signal, occurs after said first bus master-elect acquires bus ownership and begins said bus transaction only when said requested bus transaction is divisible.

10. A data processing system for performing bus arbitration to control allocation of bus ownership for each of a first shared bus and a second shared bus, said data processing system comprising:
   first means having a plurality of inputs for receiving each of a plurality of independent bus request signals and having a plurality of outputs for selectively providing each of a plurality of independent bus grant signals in response thereto, said first means being a centralized independent arbiter for controlling allocation of bus ownership by independently pre-selecting a bus master-elect of said first shared bus;
   second means coupled to said first means, said first shared bus and said second shared bus, said second means initially being selected by said first means as a current bus master of said first shared bus, said second means asserting a bi-directional shared bus busy signal to indicate ownership of said first shared bus, and subsequently negating said shared bus busy signal to indicate that said first shared bus is available; and
   third means coupled to said first means, said first shared bus and said second shared bus, said third means comprising a plurality of requesting bus masters, a first requesting bus master asserting a first independent bus request signal to request from said first means a bus transaction on said first shared bus, said first requesting bus master monitoring said shared bus busy signal to determine if said first shared bus is available, in response to receiving a first independent bus grant signal from said first means indicating that said first requesting bus master has been pre-selected as a first bus master-elect, said first requesting bus master negating said first independent bus request signal for a single clock period, in response to said second means negating said shared bus busy signal, to allow said first means to independently allocate ownership of said first shared bus by pre-selecting a second requesting bus master to become a second bus master-elect, thereafter said first requesting bus master beginning said bus transaction on said first shared bus.

11. The data processing system of claim 10 further comprising a shared memory system coupled to said second and third means via said predetermined number of shared buses.

12. The data processing system of claim 10 wherein said first means detects assertion of said first independent bus request signal, and asserts said first independent bus grant signal, in response thereto, said arbiter maintaining assertion of said independent bus grant signal until said first independent bus request signal is negated by said third means during said single clock period, during which time said arbiter centrally controls allocation of said first shared bus and pre-selects said second requesting bus master as said second bus master-elect for said first shared bus by asserting a second independent bus grant signal in response to detecting assertion of a second independent bus request signal by said second requesting bus master.

13. The data processing system of claim 10 wherein said second means comprises processing circuitry independent of said arbiter, said processing circuitry asserts said bus busy signal to thereby indicate ownership of said first shared bus, and negates said bus busy signal to thereby indicate that said first shared bus is available for use by a new bus master.

14. The data processing system of claim 10 wherein said second means comprises memory means.

15. The data processing system of claim 10 wherein said third means comprises processing means.

16. The data processing system of claim 10 wherein said third means comprises memory means.

* * * * *